(12) United States Patent
Glaeske et al.

(10) Patent No.: US 7,784,880 B2
(45) Date of Patent: Aug. 31, 2010

(54) BRAKING SYSTEM FOR A FLOOR CONVEYOR

(75) Inventors: Jens Glaeske, Norderstedt (DE); Michael Steiner, Todendorf (DE); Nils von Thienen, Hamburg (DE); Jens Wiegandt, Kamenz (DE); Manfred Zoske, Bark (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 12/392,647

(22) Filed: Feb. 25, 2009

(65) Prior Publication Data

US 2009/0250996 A1 Oct. 8, 2009

(30) Foreign Application Priority Data

Feb. 28, 2008 (JP) .................... 10 2008 011 719

(51) Int. Cl.
*B62D 11/24* (2006.01)
(52) U.S. Cl. ........................ 303/15; 180/6.24
(58) Field of Classification Search ................ 303/3, 303/15, 20, 155; 701/70, 71, 93; 180/6.24
See application file for complete search history.

(56) References Cited

U.S. PATENT DOCUMENTS

| | | | |
|---|---|---|---|
| 6,427,110 B1 * | 7/2002 | Manken et al. ............... 701/93 |
| 7,275,794 B2 * | 10/2007 | Huther et al. ............... 303/3 |
| 7,401,866 B2 * | 7/2008 | Huther ........................ 303/20 |
| 2001/0003401 A1 * | 6/2001 | Vikman et al. ............. 303/20 |
| 2003/0127289 A1 * | 7/2003 | Elgas et al. ............... 187/224 |
| 2004/0195911 A1 * | 10/2004 | Huther et al. ............. 303/20 |
| 2006/0231300 A1 | 10/2006 | Streipardt | |

FOREIGN PATENT DOCUMENTS

| DE | 195 10 716 A1 | 9/1996 |
|---|---|---|
| DE | 102 51 025 A1 | 5/2004 |

* cited by examiner

Primary Examiner—Christopher P Schwartz
(74) Attorney, Agent, or Firm—Vidas, Arrett & Steinkraus

(57) ABSTRACT

A braking system for a floor conveyor, which features at least one travel motor for at least one driven wheel, an electric steering control for at least one steered wheel, a service brake with a braking transmitter generating a braking signal and an electromagnetically releasable spring brake as an emergency stop brake, which is amongst others actuable when an error signal is generated in the steering control or a braking signal otherwise, which further features a superordinated vehicle control for various functions of the floor conveyor and a battery for supplying the individual electric consumers, wherein the steering control actuates a first switch at an error signal, which cuts off the electric connection between the battery and the emergency stop brake, wherein an additional switch is connected in series with the first switch and is actuable by a PWM actuator of the vehicle control, and a control line is connected between the steering control and the vehicle control, such that both switches are switched according to the clock of the PWM actuator when an error signal or a braking signal occurs.

7 Claims, 2 Drawing Sheets

BRAKING SYSTEM FOR A FLOOR CONVEYOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to the braking system for a battery operated floor conveyor, which features an electric steering control and an electric travel motor in addition. The individual functions of the floor conveyor are controlled by a vehicle control which is based on electronics.

In an electric steering control, a steering transmitter, a potentiometer or another angle transmitter for instance, generates a desired value signal, which is transmitted to an adjustment device for the steered wheel. In a steering regulation, the steering angle of the steered wheel is measured by a suitable sensor and transmitted to the controller, which moves the steering angle to the desired value in accordance with the comparison of desired and real value.

Of course, an electric steering control has to be monitored, so that there is no danger for the driver or the vehicle, respectively, at breakdown or the occurrence of errors. For these reasons, it is known to generate an error signal when such a condition occurs, which effects that an emergency stop or fail-safe brake is activated, which stops the vehicle down to standstill. Such a brake is usually an electromagnetically releasable spring brake. When the brake is energised, the brake discs are put out of engagement. When there is no more current, springs press the brake discs together and effect a corresponding braking.

It is also know to utilise such emergency stop brakes, which are usually arranged on the shaft of the travel motor, as a parking brake or for holding the vehicle on a slope. For instance, when the operation functions of the vehicle are switched off, such a brake is activated automatically. Furthermore, the operator can activate the emergency stop or fail-safe brake by generating a corresponding braking signal, when he/she wants to prevent the vehicle from self-acting movement in a slope situation.

In the known steering control, a relay which is arranged in the connection line between the vehicle battery and the emergency stop brake is opened instantaneously in the case of an error. Depending on the dimensioning of the springs of the brake, there will be a more or less strong deceleration. When the emergency stop brake is dimensioned such that it holds the vehicle even on steep slopes, the springs of the emergency stop brake must be dimensioned to be suitably stiff. This leads to a strong braking of the vehicle when the emergency stop brake is activated. The strong braking may result in a destabilisation of the vehicle, and through this, or even only through the strong deceleration, in an injury of the operator. Besides to the endangerment of the driver, the vehicle may also run out of the track when the wheel is blocking.

The present invention is based on the objective to provide a braking system for a floor conveyor which mitigates the effect of an emergency stop brake in the error case of the steering control.

BRIEF SUMMARY OF THE INVENTION

In the braking system according to the present invention, an additional switch is connected in series with the first switch and is actuable by a PWM actuator of the vehicle control. As is well known, PWM is the abbreviation for a pulse width modulation of the control pulses. It is commonly in use for such controls. Besides to that, a control line is connected between the steering control and the vehicle control, such that the switches are switched in accordance with the clock of the PWM actuator when an error signal or a braking signal occurs in the control line.

The vehicle control can operate the emergency stop brake via the PWM actuator in a controlled fashion. By clock timing the emergency stop brake, the braking action is reduced to a considerable extent, without that the demands on the safety structure are compromised.

For instance, in the error case the steering control (22) gives the command, via a CAN bus e.g., to switch the brake on and off in a slow timing, of 200 ms for instance. In periods in which the brake is switched to be without current through the PWM actuator, the first switch opens also. By switching this switch in the de-energised condition, the lifespan of the contact is considerably prolonged. When the triggering of the second switch via the PWM actuator in the demanded clock timing is not performed for whatsoever reason, then the activation of the brake is guaranteed through the opening of the first switch, which takes place always at an error signal from the electric line.

By the clock timing of the emergency stop brake, its action can be matched in broad ranges to various cases of utilisation, speed ranges and weight classes. However, according to the state of the art, a brake with a preset braking moment is provided for each construction series of the vehicles.

According to one embodiment of the present invention, the braking signal of a braking transmitter, for a hand- or parking brake for instance, or even for an additional brake, is transmitted to the vehicle control, and the PWM actuator clocks the second switch in accordance with the braking signal. For this reason, the emergency stop brake can be actuated like an usual service brake in this way.

In a further embodiment of the present invention, a time link is provided in the vehicle control, such that after the decay of a certain period of time, the first or the second switch remains open permanently. Here, the fact is taken into account that a clock timed braking is necessary for vehicles in motion only, of course. When the vehicle reaches standstill, the emergency stop brake is activated permanently.

As an alternative, a sensor may detect the standstill of the floor conveyor and transmit a standstill signal to the vehicle control, in order to keep the first or second switch open. As a matter of course, this happens only when an error signal has been generated before. Otherwise, the emergency stop brake would be activated at every stop of the vehicle.

According to a further embodiment of the present invention, the timing of the PWM actuator can be made to depend on the speed of the vehicle, on the load taken up, on the overall weight of the vehicle, on the upward or downward slope of the ground on which it travels and the like. In the utilisation as a service brake, the timing can also be made to depend on the magnitude of the braking signal.

According to a further embodiment of the present invention, the braking transmitter transmits a braking signal to the vehicle control, which on its part controls or regulates, respectively, the control of the travel motor such that the travel motor passes over into the operation as a generator (generator braking). It is possible to generate a considerable braking moment in this way, which is sufficient to apply the desired braking moment in the normal case. According to a further embodiment of the present invention, it may be dimensioned such that it exceeds and overlaps the braking force of the emergency stop brake in a clock timing through the PWM actuator, through which the emergency stop brake acts even in a standstill of the vehicle. Even here, it is decisive that a signal to actuate the emergency stop brake had been generated before, because otherwise with an usual service brake, the travel motor being at standstill, the emergency stop brake would be applied.

BRIEF DESCRIPTION OF THE SEVERAL VIEWS OF THE DRAWINGS

An example of the realisation of the present invention is explained in more detail by means of drawings in the following.

DETAILED DESCRIPTION OF THE INVENTION

Figure 1:
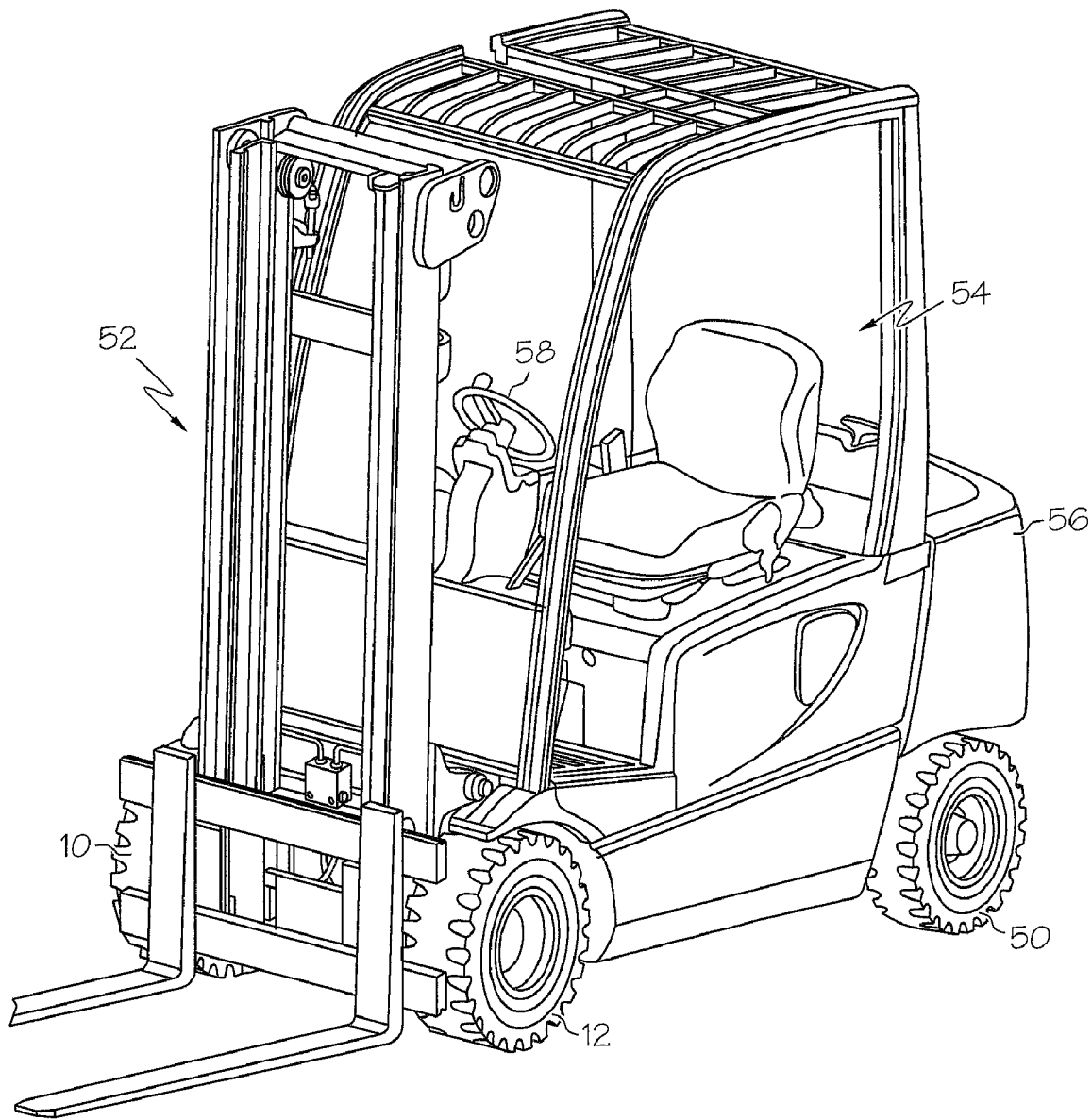
FIG. 1 shows a four wheel floor conveyor in a perspective view.

While this invention may be embodied in many different forms, there are described in detail herein a specific preferred embodiment of the invention. This description is an exemplification of the principles of the invention and is not intended to limit the invention to the particular embodiment illustrated The counterweight stacker depicted in FIG. 1, which is a four wheel vehicle, will not be described in more detail. One recognises one of two rear steered wheels 50 and two front driven wheels 10, 12. Besides to that, the vehicle depicted in FIG. 1 has a lifting scaffold 52, a driver cabin 54 and a counterweight 56 on the rear end, as well as a steering wheel 58 in the driver cabin. The control of the individual functions of the floor conveyor is performed electrically, in particular the travel control and the steering control. The individual control operations, a suitable braking system in particular, are explained by means of FIG. 2.

Figure 2:
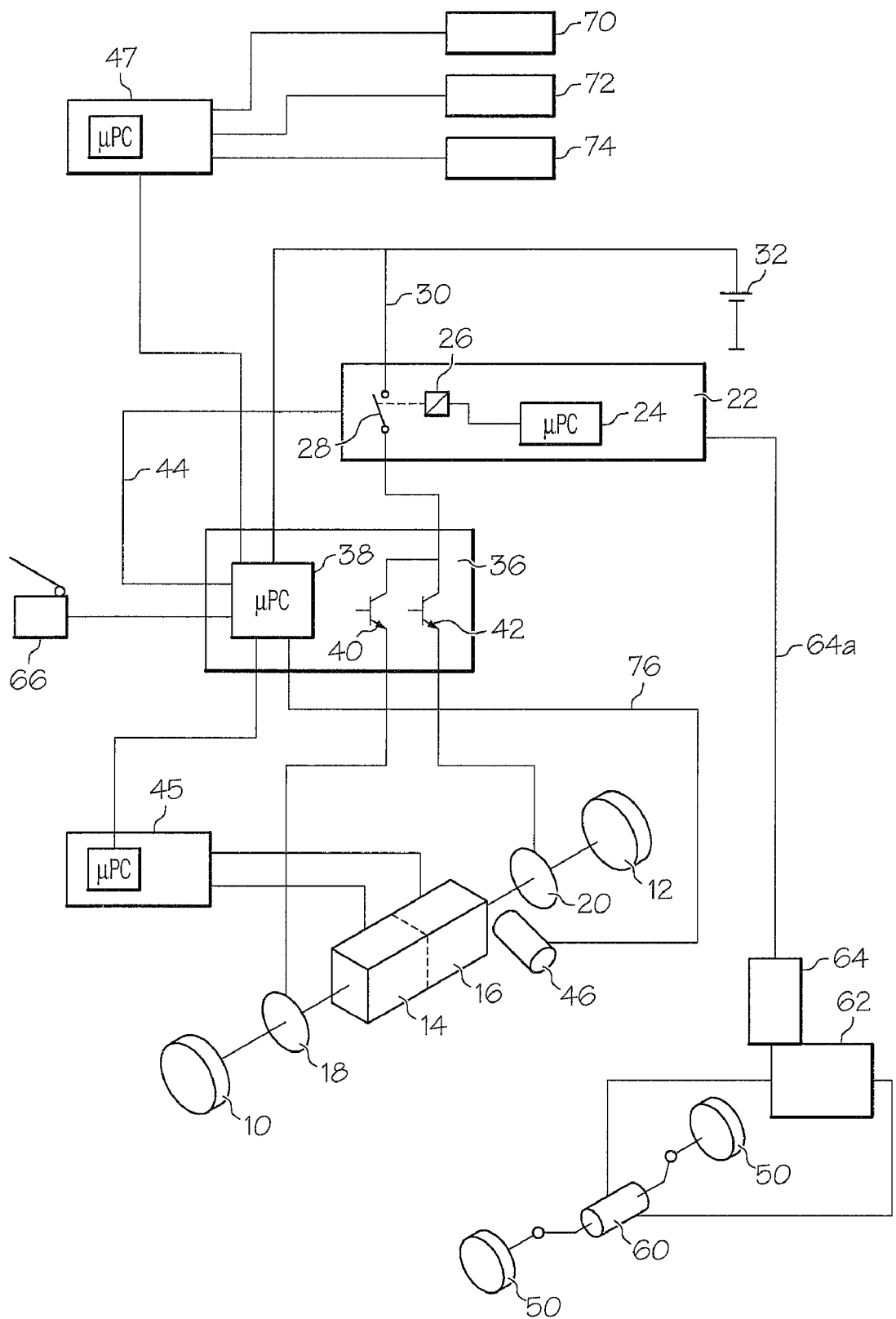
FIG. 2 shows a simple circuit diagram of a braking system for the floor conveyor according to FIG. 1

In FIG. 2, the driven wheels 10, 12 are each one at a time driven by a travel motor 14 and 16, respectively. The control for the travel motors is represented by a block 45.

On the shafts of the travel motors 14, 16 sit emergency stop or fail-safe brakes 18 and 20, respectively. They are realised as electromagnetically releasable spring brakes. When the electromagnets are de-energised, the brakes are in engagement, wherein the braking moment is pre-set by the dimensioning of the springs. When energising, the brake is released, i.e. for instance a brake disc is brought into a releasing position against the pressure of the springs.

The not shown floor conveyor has an electric steering. For this purpose, the steering transmitter (the steering wheel 58) is coupled to an angle transmitter (not shown), which transmits electric signals to a steering control 22. In this, the steering control 22 adjusts at least one steered wheel 50 of the floor conveyor. The steering control 22 contains a microprocessor 24. The electric steering control 22 contains also a relay 26, whose contact 28 is connected in a line 30, which is in connection to a battery 32. The battery 32 serves for the supply of all the electrically or electronically, respective, operated components of the floor conveyor. The relay 26 is triggered by the microprocessor 24.

The steering of the steered wheels 50 is performed by means of an hydraulic cylinder 60, which is fed by a steering pump 62. The steering pump is driven by a steering motor 64, which is triggered by the steering control 22 via a line 64a.

A superordinated vehicle control 36 is adumbrated besides to this, which contains a microprocessor 38, which monitors and controls, respectively, all the remaining functions of the vehicle. This is commonly known and will not be dwelled on in more detail. The vehicle control 36 contains also two electronic power switches 40, 42, which are controlled by the microprocessor 38. The microprocessor 38 is connected to the steering control 22 via a CAN bus 44. The parallel connected power switches 40, 42 are in series with the contact point 28 of the relay 26. The line 30 leads to the emergency stop brakes or fail-safe brakes, respectively 18, 20, in order to energise the electromagnets of the brakes.

A monitoring of the steering control 22 with respect to its function belongs also to the steering control 22. When the same is disturbed, it must be avoided that the floor conveyor can continue to travel. For this purpose, the emergency stop brakes 18 and 20, respectively, are then activated. This is performed by cutting off the energy supply of the brakes 18, 20. In this case, the microprocessor 24 opens the contact 28 via the relay 26, so that the brakes 18, 20 are de-energised.

As a sudden de-energisation of the brakes 18, 20 results in a maximum braking moment, this causes a sudden braking of the floor conveyor, which might have undesired consequences. With the aid of the not shown microprocessor 38 and of a not shown PWM actuator in the vehicle control 36, there is a clock timing of the semiconductor switches 40, 42. With the actuation or clock timing, respectively, of the switches 40, 42, there is in parallel an opening and closing of the contact 28 via the can bus 40. Thus, as soon as an error is detected in the steering control 22 which results in an activation of the brakes 18, 20, the microprocessor 38 is triggered via the CAN bus 44, so that is clocks the semiconductor switches 40, 42 via the PWM actuator, i.e. opens and closes them for short periods of time. In the same timing, the contact 28 is actuated. Thus, a reduced braking moment is built up on the brakes 18, 20, and the vehicle is decelerated less than this would be the case when the emergency stop brake would act with maximum braking moment. When the vehicle has arrived in the standstill, a continued clock timing of the switches 28, 40, 42 is no more necessary, and they may remain opened. It is sufficient when only the contact 28 remains opened. The same provides also that an engagement of the brakes 18, 20 is guaranteed in the emergency case when the clock timing of the switches 40, 42 is not in function.

With the clock timed activation of the brakes 18, 20, it is also possible to utilise the same as service brakes, for instance then when the conventional service brake, which is not depicted here, is no more sufficient to apply the needed braking moment.

The brakes 18, 20 can also be used as hand brakes or as parking brakes, wherein they can also be brought into engagement in a clock timed way. A braking transmitter, a brake pedal for instance, is depicted at 66 in FIG. 2. It is connected to the microprocessor 38 of the vehicle control 36. As was described, the clock timing of the brakes 18, 20 takes place in the same. This may take place depending on various conditions of operation. In FIG. 2, three sensors are depicted. A sensor 70 reacts to the load of the floor conveyor. A sensor 72 reacts to the upward or the downward slope, respectively, of the ground on which is travelled e.g. A sensor 74 measures the travelling speed, for instance. The sensors 70 to 74 are connected to a microprocessor 47, which on its part is connected to the microprocessor 38 for the superordinated vehicle control.

In the normal braking case, i.e., at service braking, the signal of the braking transmitter 66 causes the switch-over of the travel motors 14, 16 into the generator operation (motor brakes). When the vehicle control is cut off, the fail-safe brakes 18, 20 are actuated also. Depending on the circumstances, the brakes 18, 20 are complementarily used in the motor braking. Even in this case there is a clock timing of the brakes, as was described above, so that they do not act with full braking moment.

Thus, the clock timing of the brakes 18, 20 can be performed depending on various parameters, for instance it can be made to depend on the speed of the vehicle, on the load of the vehicle, on the height of the load, on the overall weight of the vehicle and so on. It is also possible to detect the standstill of the vehicle via a sensor 46, which reacts to the driving shaft for the driven wheels 10, 12 e.g., in order to transmit a signal to the steering control 22 or to the vehicle control (the vehicle master) which stops the clock timing and keeps at least one switch in the line 30 open. For this reason, the sensor 46 is connected to the steering control 36 or to the processor 38, respectively, via a line 76. In this, it must be made sure that these controls are used only when an error in the steering control 22 has been detected beforehand, because otherwise, the brakes 18, 20 would be activated in every stop of the floor conveyor.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A braking system for a floor conveyor, which features at least one travel motor (14, 16) for at least one driven wheel (10, 12), an electric steering control (22) for at least one steered wheel (50), a service brake with a braking transmitter generating a braking signal and an electro-magnetically releasable spring brake (18, 20) as an emergency stop brake, which is actuable when an error signal is generated in the steering control (22) or a braking signal, which further features a superordinated vehicle control (36) of the floor conveyor and a battery (32) for supplying power to an individual electrical component, wherein the steering control (22) actuates a first switch (28) at an error signal, which cuts off an electric connection between the battery (32) and the emergency stop brake, characterized in that an additional switch (40, 42) is connected in series with the first switch (28) and is actuable by a PWM actuator of the vehicle control (36), and that a control line (44) is connected between the steering control (22) and the vehicle control (36), such that both switches (28, 40, 42) are switched according to a clock of the PWM actuator when the error signal or the braking signal occurs.

2. The braking system according to claim 1, characterized in that the braking signal of the braking transmitter is transmitted to a travel control (45) via the superordinated vehicle control (36), and the PWM actuator clocks the second switch (40, 42) in accordance with the braking signal.

3. The braking system according to claim 1, characterized in that a time link is provided in the superordinated vehicle control (36), such that after the decay of a preset period of time, the first switch, the second switch, or a combination thereof (28, 40, 42) are permanently held open.

4. The braking system according to claim 1, characterized in that a sensor (42) detects a standstill of the floor conveyor and transmits a standstill signal to the superordinated vehicle control (36), and the first and the second switches (28, 40, 42) are held open at a standstill signal when an error signal has been previously generated.

5. The braking system according to claim 1, characterized by having the clock of the PWM actuator receive input from a plurality of sensors (70-74), the sensors being connected to the superordinated vehicle control; and the sensors receiving input on the speed, the weight of the vehicle, the weight of the load and the slope.

6. The braking system according to claim 1, characterized in that the braking transmitter transmits the braking signal to the superordinated vehicle control (36), and the superordinated vehicle control (36) brakes down the travel motor (14, 16) in accordance with the braking signal and acting as a generator.

7. The braking system according to claim 6, characterized in that a generator braking force is dimensioned such that the same exceeds at least temporarily a braking force of the emergency stop brake which is reduced by the clock of the PWM actuator timing of the second switch (40, 42), until the vehicle has reached standstill.

* * * * *